(12) United States Patent
Dong

(10) Patent No.: US 11,912,098 B2
(45) Date of Patent: Feb. 27, 2024

(54) REAR SUSPENSION SYSTEM OF AN ALL-TERRAIN VEHICLE AND ALL-TERRAIN VEHICLE

(71) Applicant: SEGWAY TECHNOLOGY CO., LTD., Changzhou (CN)

(72) Inventor: Zhen Dong, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 17/987,000

(22) Filed: Nov. 15, 2022

(65) Prior Publication Data
US 2023/0150327 A1    May 18, 2023

(30) Foreign Application Priority Data

Nov. 16, 2021 (CN) .......................... 202111357388.7
Nov. 16, 2021 (CN) .......................... 202122809192.9

(51) Int. Cl.
| | | |
|---|---|---|
| *B60G 7/00* | (2006.01) | |
| *B60G 7/02* | (2006.01) | |
| *B60G 13/00* | (2006.01) | |
| *B62D 21/11* | (2006.01) | |
| *B60G 21/02* | (2006.01) | |
| *B60G 21/055* | (2006.01) | |
| *B62D 21/02* | (2006.01) | |

(52) U.S. Cl.
CPC ............. *B60G 7/001* (2013.01); *B60G 7/005* (2013.01); *B60G 7/02* (2013.01); *B60G 13/005* (2013.01); *B60G 21/026* (2013.01); *B60G 21/0551* (2013.01); *B62D 21/02* (2013.01); *B62D 21/11* (2013.01)

(58) Field of Classification Search
CPC .......... B60G 7/001; B60G 7/005; B60G 7/02; B60G 13/005; B60G 21/026; B60G 21/0551; B62D 21/02; B62D 21/11
See application file for complete search history.

(56) References Cited

U.S. PATENT DOCUMENTS

| | | | |
|---|---|---|---|
| 2006/0208448 A1* | 9/2006 | Dundon ............. | B60G 21/0551 280/124.152 |
| 2016/0347137 A1* | 12/2016 | Despres-Nadeau .... | B60G 3/202 |
| 2017/0072756 A1* | 3/2017 | Dusini ..................... | F16C 11/04 |
| 2018/0264902 A1* | 9/2018 | Schroeder ................ | B60G 3/20 |
| 2018/0326843 A1* | 11/2018 | Danielson ............ | B60G 15/062 |

(Continued)

*Primary Examiner* — Paul N Dickson
*Assistant Examiner* — Shams Dhanani
(74) *Attorney, Agent, or Firm* — Emerson, Thomson & Bennett, LLC; Roger D. Emerson; Matt J. Wilson

(57) ABSTRACT

This disclosure discloses a rear suspension system of an all-terrain vehicle and an all-terrain vehicle. The rear suspension system includes a left rear suspension assembly and a right rear suspension assembly, which include: an axle support; a main control arm, having a first outer end, a first inner end, and a second inner end; a front upper control arm, having a second outer end and a third inner end; and a rear upper control arm, having a third outer end and a fourth inner end, where a connection line between the first and second inner ends is L1, a center axis of the first outer end is L2, a connection line between the third and fourth inner ends is L3, a connection line between the second and third outer ends is L4, and L1, L2, L3, and L4 are parallel to each other.

18 Claims, 3 Drawing Sheets

(56) References Cited

U.S. PATENT DOCUMENTS

| | | | |
|---|---|---|---|
| 2019/0291523 A1* | 9/2019 | Yoshida | B60K 17/165 |
| 2019/0367086 A1* | 12/2019 | De Grammont | B60G 7/001 |
| 2021/0031579 A1* | 2/2021 | Booth | B60G 13/00 |
| 2022/0204079 A1* | 6/2022 | Takimoto | B60G 7/005 |
| 2022/0234404 A1* | 7/2022 | Li | B62D 21/02 |
| 2022/0234663 A1* | 7/2022 | Gordon | B62D 23/005 |
| 2023/0038448 A1* | 2/2023 | Okuyama | B60G 7/005 |
| 2023/0110902 A1* | 4/2023 | Li | B60G 3/202 280/124.1 |
| 2023/0148013 A1* | 5/2023 | He | B62D 33/0625 180/311 |
| 2023/0150325 A1* | 5/2023 | Zhang | B60G 11/02 280/5.514 |

* cited by examiner

REAR SUSPENSION SYSTEM OF AN ALL-TERRAIN VEHICLE AND ALL-TERRAIN VEHICLE

CROSS REFERENCE TO RELATED APPLICATIONS

The present disclosure claims priority to Chinese Application No. 202122809192.9 filed on Nov. 16, 2021, and entitled REAR SUSPENSION SYSTEM OF AN ALL-TERRAIN VEHICLE AND ALL-TERRAIN VEHICLE, and Chinese Application No. 202111357388.7 filed on Nov. 16, 2021, and entitled "ALL-TERRAIN VEHICLE", all of which are incorporated herein by reference in their entirety.

TECHNICAL FIELD

This disclosure relates to the technical field of all-terrain vehicles, and in particular, to a rear suspension system of an all-terrain vehicle and an all-terrain vehicle.

BACKGROUND

Currently, a suspension system is mainly used in a road and off-road dual-purpose vehicle. A chassis and a suspension system of the vehicle need to have a large movement journey, a barrier passing capability, and an off-road capability, and a rear suspension system of the vehicle mostly uses a multi-link suspension structure. However, a current rear suspension system still has some shortcomings in wheel positioning, and suspension comfort and support force in various driving conditions.

SUMMARY

Embodiments of this disclosure are intended to resolve at least one of technical problems in the prior art. Therefore, an embodiment of this disclosure provides a rear suspension system of an all-terrain vehicle. In a moving process of the all-terrain vehicle, moving directions of suspension links (for example, a main control arm, a front upper control arm, and a rear upper control arm) are limited to straight lines parallel to each other, thereby reducing impact of movements of the suspension links on an axle support, and further ensuring an accurate and reasonable wheel positioning characteristic. The rear suspension system of the all-terrain vehicle may reduce a tilt of a vehicle body to a maximum extent, maintain ground-sticking performance of wheels, and maintain wheel positioning that meets a driving requirement of the all-terrain vehicle, to meet suspension comfort and support force required by the all-terrain vehicle in various driving conditions.

An embodiment of this disclosure further provides an all-terrain vehicle.

The rear suspension system of an all-terrain vehicle according to the embodiment of this disclosure includes a left rear suspension assembly and a right rear suspension assembly. The left rear suspension assembly and the right rear suspension assembly are disposed opposite to each other in a left-right direction. The left rear suspension assembly and the right rear suspension assembly each include: an axle support; a main control arm, where the main control arm has a first outer end, a first inner end, and a second inner end, and the first outer end is rotatably connected to the axle support; a front upper control arm, where the front upper control arm has a second outer end and a third inner end, and the second outer end is rotatably connected to the axle support; a rear upper control arm, where the rear upper control arm has a third outer end and a fourth inner end, the third outer end is rotatably connected to the axle support. A center connection line between the first inner end and the second inner end is L1, a center axis of the first outer end is L2, a center connection line of the third inner end and the fourth inner end is L3, a center connection line of the second outer end and the third outer end is L4, and L1, L2, L3, and L4 are parallel to each other.

In the rear suspension system of an all-terrain vehicle in this embodiment of this disclosure, the left rear suspension assembly and the right rear suspension assembly may form a multi-link suspension structure. In this way, the all-terrain vehicle may have certain comfort. In addition, the wheels are controlled and positioned through the multi-link suspension structure, so that the wheels and the ground are vertical as far as possible, the tilt of the vehicle body is reduced to the maximum extent, and the ground-sticking performance of the wheels is maintained. In addition, L1, L2, L3, and L4 are parallel to each other, so that wheel positioning that meets the driving requirement of the all-terrain vehicle can be maintained, to meet the suspension comfort and support force required by the all-terrain vehicle in various driving conditions.

In some examples of this disclosure, a vertical plane that passes through a midpoint of a center connection line of the two axle supports of the left rear suspension assembly and the right rear suspension assembly is a first reference plane, and the left rear suspension assembly and the right rear suspension assembly are symmetrically disposed relative to the first reference plane.

In some examples of this disclosure, the first inner end is located in front of the second inner end, a distance from the first inner end to the first reference plane is a1, a distance from the second inner end to the first reference plane is a2, and a1 and a2 meet a relational expression: a1>a2.

In some examples of this disclosure, a horizontal plane that passes through the center connection line of the two axle supports is a second reference plane, an angle between a projection of L1 on the second reference plane and a projection of the first reference plane on the second reference plane is α, and α meets a relational expression: $10° \leq α \leq 25°$.

In some examples of this disclosure, the axle support includes a main support, an upper mounting part, and a lower mounting part, both the upper mounting part and the lower mounting part are disposed on the main support and protrude inward, the first outer end is connected to the lower mounting part, and the second outer end and the third outer end are connected to the upper mounting part.

In some examples of this disclosure, the rear suspension system further includes a stabilizer bar, where two ends of the stabilizer bar are respectively connected to the main control arm of the left rear suspension assembly and the main control arm of the right rear suspension assembly. The left rear suspension assembly and the right rear suspension assembly each include a shock absorber, where a lower end of the shock absorber is disposed on the main control arm.

In some examples of this disclosure, the main control arm includes a first rod and a second rod, the first rod is located in front of the second rod, an outer end of the first rod is connected to an outer end of the second rod to form the first outer end, an inner end of the first rod is the first inner end, an inner end of the second rod is the second inner end, the ends of the stabilizer bar and the lower end of the shock absorber are disposed on the first rod or the second rod, the ends of the stabilizer bar are disposed adjacent to a midpoint of the first rod or the second rod, and the lower end of the absorber is disposed adjacent to the first outer end.

In some examples of this disclosure, the rear suspension system of an all-terrain vehicle further includes a ball joint bearing. The outer ends of the main control arm, the front upper control arm, and the rear upper control arm are connected to the axle support through the ball joint bearing.

An embodiment of this disclosure further provides another all-terrain vehicle, including: a frame; a cockpit, disposed in the middle of the frame, where two seats are disposed side by side in the cockpit; wheels, supporting the frame and including front wheels and rear wheels; a front suspension system, connecting the front wheels to the frame; and a rear suspension system, connecting the rear wheels to the frame. The rear suspension system includes a left rear suspension assembly and a right rear suspension assembly. The left rear suspension assembly and the right rear suspension assembly are disposed opposite to each other in a left-right direction. The left rear suspension assembly and the right rear suspension assembly each include: an axle support; a main control arm, where a mounting base is disposed on the main control arm, the main control arm has a first outer end, a first inner end, and a second inner end, and the first outer end is rotatably connected to the axle support; a front upper control arm, where the front upper control arm has a second outer end and a third inner end, and the second outer end is rotatably connected to the axle support; a rear upper control arm, where the front upper control arm and the rear upper control arm each are of a rod-like structure, the rear upper control arm has a third outer end and a fourth inner end, the third outer end is rotatably connected to the axle support. A center connection line between the first inner end and the second inner end is L1, a center axis of the first outer end is L2, a center connection line of the third inner end and the fourth inner end is L3, a center connection line of the second outer end and the third outer end is L4, and L1, L2, L3, and L4 are parallel to each other.

In the all-terrain vehicle in this embodiment of this disclosure, the left rear suspension assembly and the right rear suspension assembly may form a multi-link suspension structure. In this way, the all-terrain vehicle may have certain comfort. In addition, the wheels are controlled and positioned through the multi-link suspension structure, so that the wheels are perpendicular to the ground as far as possible, the tilt of the vehicle body is reduced to the maximum extent, and ground-sticking performance of the wheels is maintained. In addition, L1, L2, L3, and L4 are parallel to each other, so that wheel positioning that meets a driving requirement of the all-terrain vehicle can be maintained, to meet suspension comfort and support force required by the all-terrain vehicle in various driving conditions.

In some examples of this disclosure, the main control arm includes a first rod and a second rod, the first rod is located in front of the second rod, an outer end of the first rod is fixedly connected to an outer end of the second rod to form the first outer end, an inner end of the first rod is the first inner end, an inner end of the second rod is the second inner end.

In some examples of this disclosure, the all-terrain vehicle further includes a stabilizer bar and shock absorbers. Two ends of the stabilizer bar are respectively connected to the main control arm of the left rear suspension assembly and the main control arm of the right rear suspension assembly, and lower ends of the shock absorbers are disposed on the main control arms.

In some examples of this disclosure, the ends of the stabilizer bar and the lower ends of the shock absorbers are disposed on the first rod or the second rod, the ends of the stabilizer bar are disposed adjacent to a midpoint of the first rod or the second rod, and the lower ends of the shock absorbers are disposed adjacent to the first outer ends.

In some examples of this disclosure, a vertical plane that passes through a midpoint of a center connection line of the two axle supports of the left rear suspension assembly and the right rear suspension assembly is a first reference plane, and the left rear suspension assembly and the right rear suspension assembly are symmetrically disposed relative to the first reference plane.

In some examples of this disclosure, the first inner end is located in front of the second inner end, a distance from the first inner end to the first reference plane is a1, a distance from the second inner end to the first reference plane is a2, and a1 and a2 meet a relational expression: a1>a2.

In some examples of this disclosure, a horizontal plane that passes through the center connection line of the two axle supports is a second reference plane, an angle between the projection of L1 on the second reference plane and the projection of the first reference plane on the second reference plane is a, and a meets a relational expression: $10° \leq a \leq 25°$.

In some examples of this disclosure, the all-terrain vehicle further includes a ball joint bearing. The outer ends of the main control arm, the front upper control arm, and the rear upper control arm are connected to the axle support through the ball joint bearing.

In some examples of this disclosure, the axle support includes a main support, an upper mounting part, and a lower mounting part, both the upper mounting part and the lower mounting part are disposed on the main support and protrude inward, the first outer end is connected to the lower mounting part, and the second outer end and the third outer end are connected to the upper mounting part.

The all-terrain vehicle according to this embodiment of this disclosure includes the foregoing rear suspension system of an all-terrain vehicle.

Some of additional aspects and advantages of this disclosure are provided in the following descriptions, and some of the additional aspects and advantages will become apparent from the following descriptions, or may be learned from practice of this disclosure.

BRIEF DESCRIPTION OF THE DRAWINGS

The foregoing and/or additional aspects and advantages of this disclosure will become apparent and readily understood from descriptions of embodiments with reference to the following drawings.

REFERENCE NUMERALS

Figure 1:
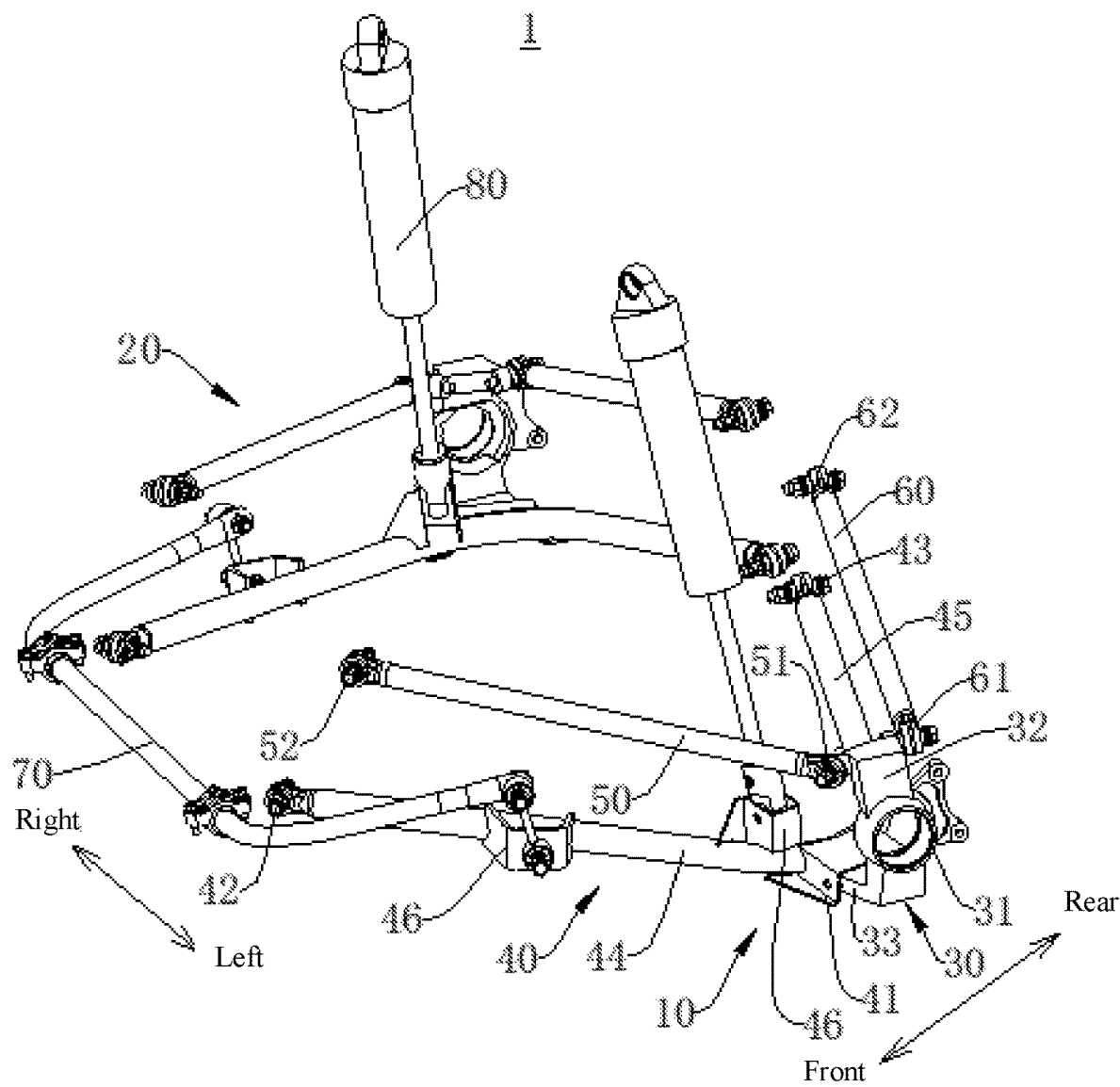
FIG. 1 is a schematic diagram of a structure of a rear suspension system according to an embodiment of this disclosure.

1: rear suspension system; 10: left rear suspension assembly; 20: right rear suspension assembly; 30: axle support; 31: main support; 32: upper mounting part; 33: lower mounting part; 40: main control arm; 41: first outer end; 42: first inner end; 43: second inner end; 44: first rod; 45: second rod; 46: mounting base; 50: front upper control arm; 51: second outer end; 52: third inner end; 60: rear upper control arm; 61: third outer end; 62: fourth inner end; 70: stabilizer bar; 80: shock absorber; 2: all-terrain vehicle; 90: frame; 100: wheels; 101: front wheel; 102: rear wheel; 110: cockpit; 111: seat; 120: front suspension system; B1: ball joint bearing; and P1: first reference plane.

DETAILED DESCRIPTION

The following describes the embodiments of this disclosure in detail. The embodiments described with reference to the drawings are exemplary. The following describes the embodiments of this disclosure in detail.

Refer to FIG. 1 to FIG. 4. The following describes a rear suspension system 1 of an all-terrain vehicle 2 according to an embodiment of this disclosure. The rear suspension system 1 is disposed on the terrain vehicle 2, and certainly, may also be applied to another off-road vehicle.

As shown in FIG. 1 to FIG. 4, the rear suspension system 1 of the all-terrain vehicle 2 according to this embodiment of this disclosure includes a left rear suspension assembly 10 and a right rear suspension assembly 20. The left rear suspension assembly 10 and the right rear suspension assembly 20 are disposed between a frame 90 and wheels 100 of the all-terrain vehicle 2, and play a role of supporting and controlling. The left rear suspension assembly 10 and the right rear suspension assembly 20 are disposed opposite to each other in a left-right direction. The left rear suspension assembly 10 acts between the frame 90 and the left wheels 100, and the right rear suspension assembly 20 acts between the frame 90 and the right wheels 100, so that the wheels 100 on both sides of the all-terrain vehicle 2 can be controlled, and the all-terrain vehicle 2 is more stable, more comfortable, and safer in a driving process.

Figure 2:
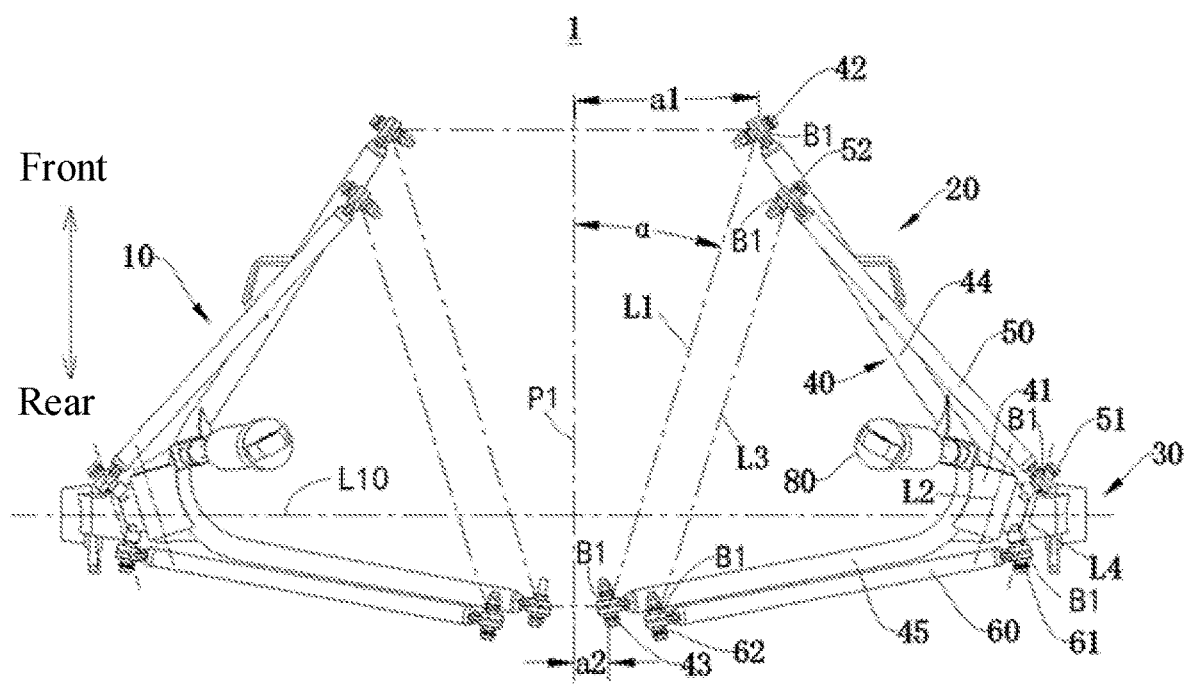
FIG. 2 is a schematic diagram of a partial structure of a rear suspension system according to an embodiment of this disclosure.
Figure 3:
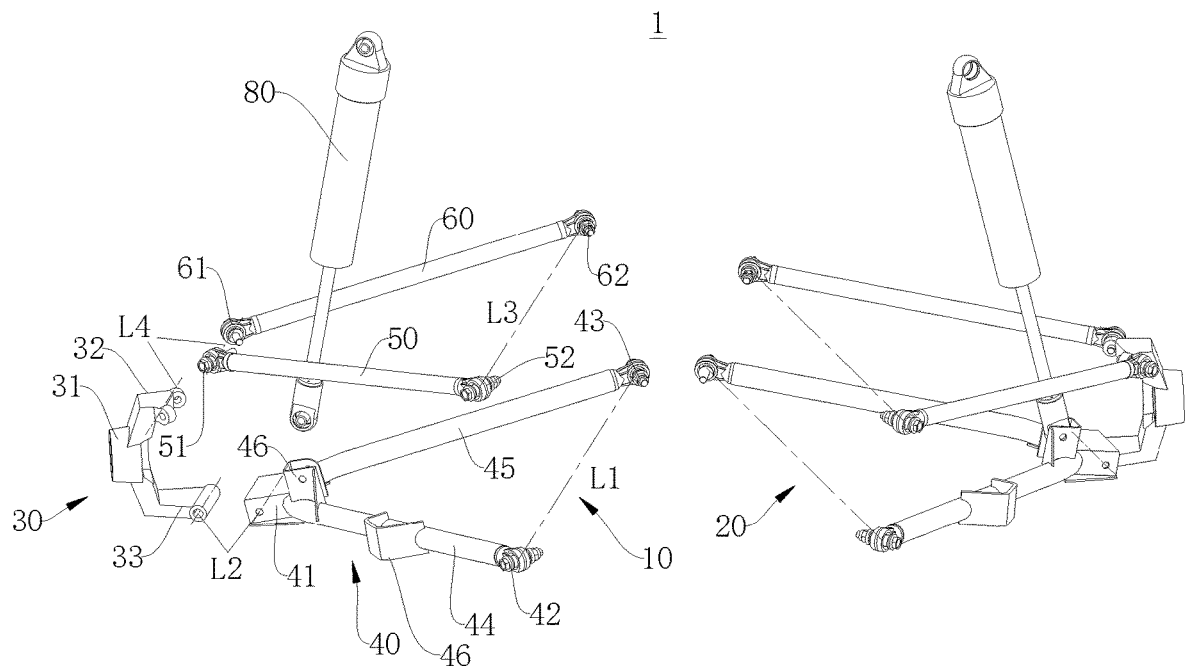
FIG. 3 is a partial exploded view of a rear suspension system according to an embodiment of this disclosure.

As shown in FIG. 1 to FIG. 3, the left rear suspension assembly 10 and the right rear suspension assembly 20 each include: an axle support 30, a main control arm 40, a front upper control arm 50, and a rear upper control arm 60. The axle support 30, the main control arm 40, the front upper control arm 50, and the rear upper control arm 60 are connected to each other. In addition, the main control arm 40, the front upper control arm 50, and the rear upper control arm 60 are also connected to the frame 90. In this way, a multi-link suspension structure may be formed. The multi-link suspension structure can ensure certain comfort, and the wheels 100 are controlled and positioned through the multi-link suspension structure, so that the wheels 100 are perpendicular to the ground as far as possible, a tilt of a vehicle body is reduced to the maximum extent, and ground-sticking performance of the wheels 100 is maintained. The main control arm 40 may play a role of adjusting a toe-in of the wheels 100, and endures vertical load and left-right unbalance force from the wheels 100, to improve driving stability of the all-terrain vehicle 2, and effectively reduce friction of the wheels 100. The front upper control arm 50 and the rear upper control arm 60 jointly control camber angles of the wheels 100 with the main control arm 40, and endure cornering force from the wheels 100. In addition, the main control arm 40 may be a tube member, a steel plate stamping member, or a forged casting member.

Specifically, as shown in FIG. 1 to FIG. 3, the main control arm 40 has a first outer end 41, a first inner end 42, and a second inner end 43. The first outer end 41 is rotatably connected to the axle support 30. The first inner end 42 and the second inner end 43 are connected to the frame 90. The front upper control arm 50 has a second outer end 51 and a third inner end 52. The second outer end 51 is rotatably connected to the axle support 30. The third inner end 52 is connected to the frame 90. The rear upper control arm 60 has a third outer end 61 and a fourth inner end 62. The third outer end 61 is rotatably connected to the axle support 30. The fourth inner end 62 is connected to the frame 90. In this way, an integral structure of the left rear suspension assembly 10 and the right rear suspension assembly 20 is connected more stably, and can form a multi-link suspension structure together with the frame 90, thereby improving performance of the left rear suspension assembly 10 and the right rear suspension assembly 20.

As shown in FIG. 2 and FIG. 3, a center connection line between the first inner end 42 and the second inner end 43 is L1, a center axis of the first outer end 41 is L2, a center connection line between the third inner end 52 and the fourth inner end 62 is L3, a center connection line between the second outer end 51 and the third outer end 61 is L4, and L1, L2, L3, and L4 are parallel to each other. It should be noted that, in a moving process of the all-terrain vehicle 2, the first inner end 42 and the second inner end 43 may move in a direction of L1, the third inner end 52 and the fourth inner end 62 may move in a direction of L3, the second outer end 51 and the third outer end 61 may move in a direction of L4, and the width of the first outer end 41 may change in a direction of L2. These movements do not change a positioning characteristic of the wheels 100 since L1, L2, L3, and L4 are parallel to each other, and the wheel 100 positioning that meets a driving requirement of the all-terrain vehicle 2 can always be maintained. Certainly, a position may be adjusted according to a need for structural arrangement of the rear suspension system 1.

Therefore, the left rear suspension assembly 10 and the right rear suspension assembly 20 may form a multi-link suspension structure. In this way, the all-terrain vehicle 2 may have certain comfort. In addition, the wheels 100 are controlled and positioned through the multi-link suspension structure, so that the wheels 100 are perpendicular to the ground as far as possible, the tilt of the vehicle body is reduced to the maximum extent, and the ground-sticking performance of the wheels 100 is maintained. In addition, L1, L2, L3, and L4 are parallel to each other, so that the wheel 100 positioning that meets the driving requirement of the all-terrain vehicle 2 can be maintained, to meet suspension comfort and support force required by the all-terrain vehicle 2 in various driving conditions.

As shown in FIG. 2, a vertical plane that passes through a midpoint of a center connection line of the two axle supports 30 is a first reference plane P1, and the left rear suspension assembly 10 and the right rear suspension assembly 20 are symmetrically disposed relative to the first reference plane P1. The left rear suspension assembly and the right rear suspension assembly have same component structures and same operating principles. The left rear suspension assembly 10 and the right rear suspension assembly 20 are symmetrically disposed relative to the vertical plane of the midpoint of the center connection line of the two axle supports 30. In this way, the left rear suspension assembly 10 and the right rear suspension assembly 20 may respectively act on the left wheels 100 and the right wheels 100 of the all-terrain vehicle 2, so that an effect on the left wheels 100 and an effect on the right wheels 100 are the same, and the suspension comfort and a support effect of the all-terrain vehicle 2 are better.

Certainly, as shown in FIG. 2, the first inner end 42 is located in front of the second inner end 43, a distance from the first inner end 42 to the first reference plane P1 is a1, a distance from the second inner end 43 to the first reference plane P1 is a2, and a1 and a2 meet a relational expression: a1>a2. The first inner end 42 is located on the front side of the second inner end 43, and such an arrangement is reasonable. Because a plurality of parts need to be disposed between the first inner ends 42 of the left rear suspension assembly and the right rear suspension assembly, and there is no such requirement between two second inner ends 43, the distance from the first inner end 42 to the first reference plane P1 needs to be greater than the distance from the second inner end 43 to the first reference plane P1.

In addition, as shown in FIG. 2, a horizontal plane that passes through the center connection line L10 of the two axle supports 30 is a second reference plane, an angle between the projection of L1 on the second reference plane and the projection of the first reference plane P1 on the second reference plane is a, and a meets a relational expression: $10°≤α≤25°$. There is a certain relationship between an angle between L1 and the first reference plane P1 and a travel of the wheels 100 of the all-terrain vehicle 2. A range of the angle between L1 and the first reference plane P1 is set to $10°≤α≤25°$, which is reasonable. When the travel of the wheels 100 of the all-terrain vehicle 2 is small, the angle between L1 and the first reference plane P1 needs to be set to be smaller. When the travel of the wheel 100 of the all-terrain vehicle 2 is large, the angle between L1 and the first reference plane P1 needs to be set to be larger. In this way, the angle may be better coordinated with the wheels 100. In addition, the angle between L1 and the first reference plane P1 is set to be in an appropriate range, so that a stretching length of the main control arm 40 can be longer, and performance of the main control arm 40 can be better.

In addition, as shown in FIG. 1, the first inner end 42 is located in a front inner side of the third inner end 52, and the second inner end 43 is located in a front inner side of the fourth inner end 62. In this way, the first inner end 42 and the second inner end 43 are closer to the inner side, so that the stretching length of the main control arm 40 is longer, and the performance of the main control arm 40 is better.

Specifically, as shown in FIG. 1 and FIG. 3, the axle support 30 includes a main support 31, an upper mounting part 32, and a lower mounting part 33. Both the upper mounting part 32 and the lower mounting part 33 are disposed on the main support 31, and both the upper mounting part 32 and the lower mounting part 33 protrude inward. The first outer end 41 is connected to the lower mounting part 33, and the second outer end 51 and the third outer end 61 are connected to the upper mounting part 32. Both the upper mounting part 32 and the lower mounting part 33 are disposed on the main support 31. In this way, the main support 31, the upper mounting part 32, and the lower mounting part 33 may form an integrated body, to facilitate mounting of the axle support 30. The first outer end 41 is connected to the lower mounting part 33, and the second outer end 51 and the third outer end 61 are connected to the upper mounting part 32. In this way, the main control arm 40, the front upper control arm 50, and the rear upper control arm 60 are connected to the axle support 30, so that structures of the left rear suspension assembly and the right rear suspension assembly are more integrated, and a structure of the first outer end 41 is different from structures of the second outer end 51 and the third outer end 61.

Optionally, as shown in FIG. 1, the rear suspension system 1 further includes a stabilizer bar 70. Two ends of the stabilizer bar 70 are respectively connected to the main control arm 40 of the left rear suspension assembly 10 and the main control arm 40 of the right rear suspension assembly 20. The left rear suspension assembly 10 and the right rear suspension assembly 20 each include a shock absorber 80, where a lower end of the shock absorber 80 is disposed on the main control arm 40. The two ends of the stabilizer bar 70 are respectively connected to the main control arm 40 of the left rear suspension assembly 10 and the main control arm 40 of the right rear suspension assembly 20. In this way, the stabilizer bar 70 may play a role of connection, and the left rear suspension assembly 10 and the right rear suspension assembly 20 are connected to form an integrated rear suspension system 1. Certainly, the stabilizer bar 70 is disposed in a transverse direction, and the stabilizer bar 70 may improve roll angle stiffness of the rear suspension system 1 and reduce an angle of tilt of the vehicle body of the all-terrain vehicle 2. The left rear suspension assembly 10 and the right rear suspension assembly 20 each are provided with a shock absorber 80. The shock absorber 80 includes a spring and a hydraulic damper. An upper end of the shock absorber is connected to the frame 90, and a lower end of the shock absorber is disposed on the main control arm 40. When the rear suspension system 1 works, the shock absorber 80 generates a telescopic movement. When the spring is compressed, the spring may absorb impact energy from the ground through the wheels 100, the absorbed energy is released when the spring stretches, and the released energy is converted into heat for dissipation by the hydraulic damper. In this way, a shock absorption effect of the rear suspension system 1 can be implemented, thereby improving comfort of a user when driving the all-terrain vehicle 2.

In addition, as shown in FIG. 1 to FIG. 3, the main control arm 40 includes a first rod 44 and a second rod 45. The first rod 44 is located in front of the second rod 45, an outer end of the first rod 44 is connected to an outer end of the second rod 45, the outer end of the first rod 44 and the outer end of the second rod 45 form the first outer end 41, an inner end of the first rod 44 is the first inner end 42, an inner end of the second rod 45 is the second inner end 43, ends of the stabilizer bar 70 and the lower end of the shock absorber 80 are disposed on the first rod 44 or the second rod 45, the ends of the stabilizer bar 70 are disposed adjacent to a midpoint of the first rod 44 or the second rod 45, and the lower end of the absorber 80 is disposed adjacent to the first outer end 41. In other words, one end of the first rod 44 that is close to the inner side is the first inner end 42, one end of the second rod 45 that is close to the inner side is the second inner end 43, and one end of the first rod 44 that is close to the outer side is connected to one end of the second rod 45 that is close to the outer side through the first outer end 41. The ends of the stabilizer bar 70 and the lower end of the shock absorber 80 are disposed on the first rod 44 or the second rod 45, and the ends of the stabilizer bar 70 are disposed adjacent to the midpoint of the first rod 44 or the second rod 45, to facilitate connection and mounting of the stabilizer bar 70 and the shock absorber 80. Therefore, the overall structure of the rear suspension system 1 is adapted to the structure of the all-terrain vehicle 2, and interference between the mounting of the stabilizer bar 70 and the shock absorber 80 and another structure may also be avoided. It should be noted that the main control arm 40 is not limited to be constructed to have the first rod 44 and the second rod 45, but may alternatively be constructed to have another reasonable structure. Certainly, the ends of the stabilizer rod 70 and the lower end of the shock absorber 80 may alternatively be disposed on the front upper control arm 50, which may be specifically limited and selected based on an actual situation.

Certainly, the rear suspension system 1 further includes a ball joint bearing B1, and the outer ends of the main control arm 40, the front upper control arm 50, and the rear upper control arm 60 are all connected to the axle support 30 through the ball joint bearing B1. The ball joint bearing B1 may play a role of mounting and connection, and may rotate and sway at any angle during movement. The outer ends of the main control arm 40, the front upper control arm 50, and the rear upper control arm 60 are all connected to the axle support 30 through the ball joint bearing B1. In this way, the main control arm 40, the front upper control arm 50, and the rear upper control arm 60 may move relative to the axle support 30, these movements do not change a positioning characteristic of the wheels 100, and the wheel 100 positioning that meets the driving requirement of the all-terrain vehicle 2 can always be maintained.

Figure 4:
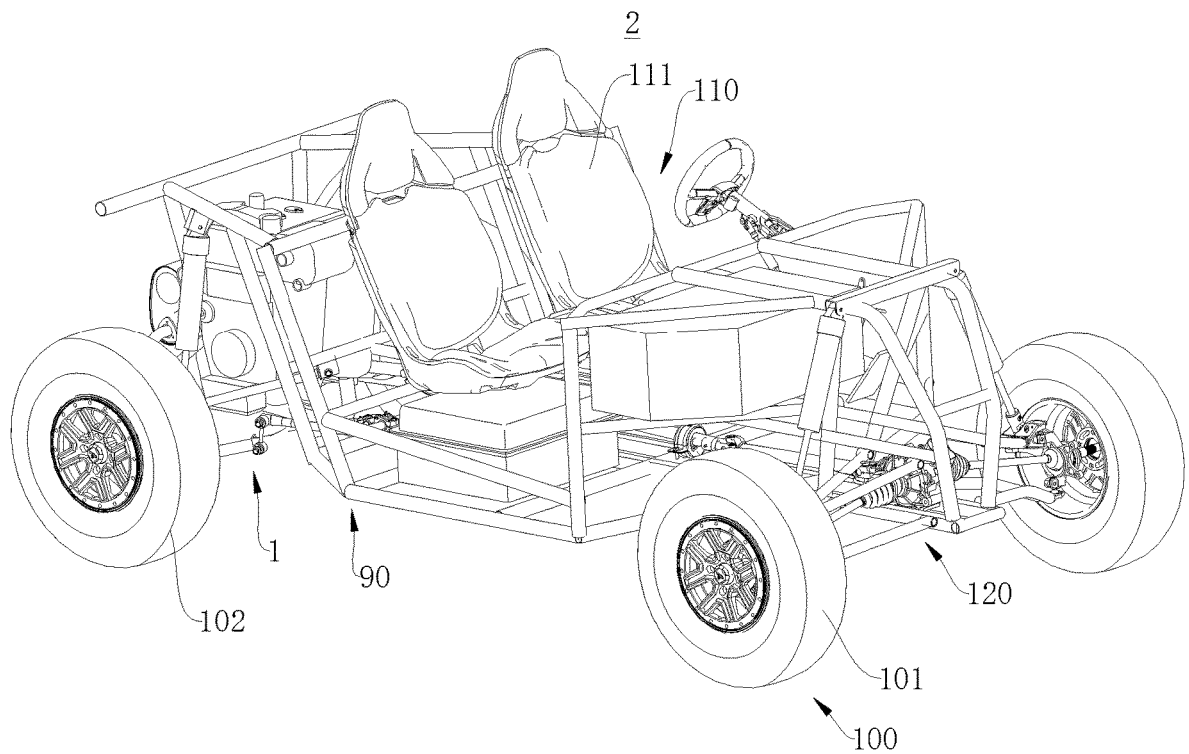
FIG. 4 is a schematic diagram of a structure of an all-terrain vehicle according to another embodiment of this disclosure.

As shown in FIG. 4, the all-terrain vehicle 2 according to this embodiment of this disclosure includes the rear suspension system 1 of the all-terrain vehicle 2 described in the foregoing embodiment. The all-terrain vehicle 2 may control positioning of the wheels 100 through the rear suspension system 1. In this way, the suspension comfort and support force required by the all-terrain vehicle 2 in various driving conditions can be met.

The following describes another all-terrain vehicle 2 according to an embodiment of this disclosure with reference to FIG. 1 to FIG. 4.

As shown in FIG. 4, the all-terrain vehicle 2 according to an embodiment of this disclosure includes a frame 90, a cockpit 110, wheels 100, a front suspension system 120, and a rear suspension system 1. The frame 90 may play a role of mounting and supporting the whole all-terrain vehicle 2, and form a whole frame of the all-terrain vehicle 2. The cockpit 110 is disposed in the middle of the frame 90 and is mainly used for driving the all-terrain vehicle 2 by a driver, and two seats 111 are disposed side by side in the cockpit 110. In this way, the driver may sit on the seat 111 for operation, so that comfort of driving by the driver can be improved. In addition, the two seats 111 are disposed, and this arrangement is reasonable, so that two persons may ride at the same time.

As shown in FIG. 3, the wheels 100 may mainly drive the all-terrain vehicle 2 to move, and may be used to support the frame 90. The wheels 100 include front wheels 101 and rear wheels 102. The front suspension system 120 mainly connects the front wheels 101 to the frame 90, and the rear suspension system 1 mainly connects the rear wheels 102 to the frame 90. In this way, the wheels 100 may be better connected to the frame 90, and the all-terrain vehicle 2 may be driven to move as a whole by the wheels. In addition, the all-terrain vehicle 2 may control positioning of the wheels 100 by using the rear suspension system 1. In this way, suspension comfort and support force required by the all-terrain vehicle 2 in various driving conditions can be met.

The rear suspension system 1 includes a left rear suspension assembly 10 and a right rear suspension assembly 20. The left rear suspension assembly 10 and the right rear suspension assembly 20 are disposed between the frame 90 and the wheels 100 of the all-terrain vehicle 2, and play a role of supporting and controlling. The left rear suspension assembly 10 and the right rear suspension assembly 20 are disposed opposite to each other in a left-right direction. The left rear suspension assembly 10 acts between the frame 90 and the left wheels 100, and the right rear suspension assembly 20 acts between the frame 90 and the right wheels 100, so that the wheels 100 on both sides of the all-terrain vehicle 2 can be controlled, and the all-terrain vehicle 2 is more stable, more comfortable, and safer in a driving process.

As shown in FIG. 1 to FIG. 3, the left rear suspension assembly 10 and the right rear suspension assembly 20 each include: an axle support 30, a main control arm 40, a front upper control arm 50, and a rear upper control arm 60. The axle support 30, the main control arm 40, the front upper control arm 50, and the rear upper control arm 60 are connected to each other. In addition, the main control arm 40, the front upper control arm 50, and the rear upper control arm 60 are also connected to the frame 90. In this way, a multi-link suspension structure may be formed. The multi-link suspension structure can ensure certain comfort, and the wheels 100 are controlled and positioned through the multi-link suspension structure, so that the wheels 100 are perpendicular to the ground as far as possible, a tilt of a vehicle body is reduced to the maximum extent, and ground-sticking performance of the wheels 100 is maintained. The main control arm 40 may play a role of adjusting a toe-in of the wheels 100, and endures vertical load and left-right unbalance force from the wheels 100, to improve driving stability of the all-terrain vehicle 2, and effectively reduce friction of the wheels 100. The front upper control arm 50 and the rear upper control arm 60 jointly control camber angles of the wheels 100 with the main control arm 40, and endure cornering force from the wheels 100. In addition, the main control arm 40 may be a tube member, a steel plate stamping member, or a forged casting member, and the front upper control arm 50 and the rear upper control arm 60 each are of a rod-like structure. In this way, connection and arrangement of the front upper control arm 50 and the rear upper control arm 60 are more facilitated.

Specifically, as shown in FIG. 1 to FIG. 3, a mounting base 46 is disposed on the main control arm 40, and the mounting base 46 may be configured to mount a stabilizer bar 70 and a shock absorber 80. The main control arm 40 has a first outer end 41, a first inner end 42, and a second inner end 43. The first outer end 41 is rotatably connected to the axle support 30. The first inner end 42 and the second inner end 43 are connected to the frame 90. The front upper control arm 50 has a second outer end 51 and a third inner end 52. The second outer end 51 is rotatably connected to the axle support 30. The third inner end 52 is connected to the frame 90. The rear upper control arm 60 has a third outer end 61 and a fourth inner end 62. The third outer end 61 is rotatably connected to the axle support 30. The fourth inner end 62 is connected to the frame 90. In this way, an integral structure of the left rear suspension assembly 10 and the right rear suspension assembly 20 is connected more stably, and can form a multi-link suspension structure together with the frame 90, thereby improving performance of the left rear suspension assembly 10 and the right rear suspension assembly 20.

As shown in FIG. 2, a center connection line between the first inner end 42 and the second inner end 43 is L1, a center axis of the first outer end 41 is L2, a center connection line between the third inner end 52 and the fourth inner end 62 is L3, a center connection line between the second outer end 51 and the third outer end 61 is L4, and L1, L2, L3, and L4 are parallel to each other. It should be noted that, in a moving process of the all-terrain vehicle 2, the first inner end 42 and the second inner end 43 may move in a direction of L1, the third inner end 52 and the fourth inner end 62 may move in a direction of L3, the second outer end 51 and the third outer end 61 may move in a direction of L4, and the width of the first outer end 41 may change in a direction of L2. These movements do not change a positioning characteristic of the wheels 100 since L1, L2, L3, and L4 are parallel to each other, and the wheel 100 positioning that meets a driving requirement of the all-terrain vehicle 2 can always be maintained. Certainly, a position may be adjusted according to a need for structural arrangement of the rear suspension system 1.

Therefore, the left rear suspension assembly 10 and the right rear suspension assembly 20 may form a multi-link suspension structure. In this way, the all-terrain vehicle 2 may have certain comfort. In addition, the wheels 100 are controlled and positioned through the multi-link suspension structure, so that the wheels 100 are perpendicular to the ground as far as possible, the tilt of the vehicle body is reduced to the maximum extent, and the ground-sticking performance of the wheels 100 is maintained. In addition, L1, L2, L3, and L4 are parallel to each other, so that the wheel 100 positioning that meets the driving requirement of the all-terrain vehicle 2 can be maintained, to meet suspension comfort and support force required by the all-terrain vehicle 2 in various driving conditions.

As shown in FIG. 1 to FIG. 3, the main control arm 40 includes a first rod 44 and a second rod 45. The first rod 44 is located in front of the second rod 45, an outer end of the first rod 44 is fixedly connected to an outer end of the second rod 45, the outer end of the first rod 44 and the outer end of the second rod 45 form the first outer end 41, an inner end of the first rod 44 is the first inner end 42, and an inner end of the second rod 45 is the second inner end 43. In other words, one end of the first rod 44 that is close to the inner side is the first inner end 42, one end of the second rod 45 that is close to the inner side is the second inner end 43, and one end of the first rod 44 that is close to the outer side is connected to one end of the second rod 45 that is close to the outer side through the first outer end 41. Such arrangement is more reasonable. In addition, when the first inner end 42 and the second inner end 43 move in the direction of L1, the third inner end 52 and the fourth inner end 62 move in the direction of L3, and the second outer end 51 and the third outer end 61 move in the direction of L4, the positioning characteristic of the wheels 100 may not be changed, and the wheel 100 positioning that meets the driving requirement of the all-terrain vehicle 2 can always be maintained.

Optionally, as shown in FIG. 1, the all-terrain vehicle 2 further includes the stabilizer bar 70 and the shock absorbers 80. Two ends of the stabilizer bar 70 are respectively connected to the main control arm 40 of the left rear suspension assembly 10 and the main control arm 40 of the right rear suspension assembly 20, and lower ends of the shock absorbers 80 are disposed on the main control arms 40. The two ends of the stabilizer bar 70 are respectively connected to the main control arm 40 of the left rear suspension assembly 10 and the main control arm 40 of the right rear suspension assembly 20. In this way, the stabilizer bar 70 may play a role of connection, and the left rear suspension assembly 10 and the right rear suspension assembly 20 are connected to form an integrated rear suspension system 1. Certainly, the stabilizer bar 70 is disposed in a transverse direction, and the stabilizer bar 70 may improve roll angle stiffness of the rear suspension system 1 and reduce an angle of tilt of the vehicle body of the all-terrain vehicle 2. The shock absorber 80 includes a spring and a hydraulic damper. An upper end of the shock absorber is connected to the frame 90, and a lower end of the shock absorber is disposed on the main control arm 40. When the rear suspension system 1 works, the shock absorber 80 generates a telescopic movement. When the spring is compressed, the spring may absorb impact energy from the ground through the wheels 100, and the absorbed energy is released when the spring stretches, and the released energy is converted into heat for dissipation by the hydraulic damper. In this way, a shock absorption effect of the rear suspension system 1 can be implemented, thereby improving comfort of a user when driving the all-terrain vehicle 2.

It should be noted that, as shown in FIG. 1 to FIG. 3, the ends of the stabilizer bar 70 and the lower ends of the shock absorbers 80 are disposed on the first rod 44 or the second rod 45, the ends of the stabilizer bar 70 are disposed adjacent to a midpoint of the first rod 44 or the second rod 45, and the lower ends of the shock absorbers 80 are disposed adjacent to the first outer ends 41, to facilitate connection and mounting of the stabilizer bar 70 and the shock absorber 80. Therefore, the overall structure of the rear suspension system 1 is adapted to the structure of the all-terrain vehicle 2, and interference between the mounting of the stabilizer bar 70 and the shock absorber 80 and another structure may also be avoided. In addition, the main control arm 40 is not limited to be constructed to have the first rod 44 and the second rod 45, but may alternatively be constructed to have another reasonable structure. Certainly, the ends of the stabilizer rod 70 and the lower ends of the shock absorbers 80 may alternatively be disposed on the front upper control arm 50, which may be specifically limited and selected based on an actual situation.

In addition, as shown in FIG. 2, a vertical plane that passes through a midpoint of a center connection line of the two axle supports 30 is a first reference plane P1, and the left rear suspension assembly 10 and the right rear suspension assembly 20 are symmetrically disposed relative to the first reference plane P1. The left rear suspension assembly and the right rear suspension assembly have same component structures and same operating principles. The left rear suspension assembly 10 and the right rear suspension assembly 20 are symmetrically disposed relative to the vertical plane of the midpoint of the center connection line of the two axle supports 30. In this way, the left rear suspension assembly 10 and the right rear suspension assembly 20 may respectively act on the left wheels 100 and the right wheels 100 of the all-terrain vehicle 2, so that an effect on the left wheels 100 and an effect on the right wheels 100 are the same, and the suspension comfort and a support effect of the all-terrain vehicle 2 are better.

Certainly, as shown in FIG. 2, the first inner end 42 is located in front of the second inner end 43, a distance from the first inner end 42 to the first reference plane P1 is a1, a distance from the second inner end 43 to the first reference plane P1 is a2, and a1 and a2 meet a relational expression: a1>a2. The first inner end 42 is located on the front side of the second inner end 43, and such an arrangement is reasonable. Because a plurality of parts need to be disposed between the first inner ends 42 of the left rear suspension assembly and the right rear suspension assembly, and there is no such requirement between two second inner ends 43, the distance from the first inner end 42 to the first reference plane P1 needs to be greater than the distance from the second inner end 43 to the first reference plane P1.

In addition, as shown in FIG. 2, the horizontal plane that passes through the center connection line L10 of the two axle supports 30 is a second reference plane, the angle between the projection of L1 on the second reference plane and the projection of the first reference plane P1 on the second reference plane is a, and a meets a relational expression: $10°≤α≤25°$. There is a certain relationship between an angle between L1 and the first reference plane P1 and a travel of the wheels 100 of the all-terrain vehicle 2. The range of the angle between L1 and the first reference plane P1 is set to $10≤α≤25°$, which is reasonable. When the travel of the wheels 100 of the all-terrain vehicle 2 is small, the angle between L1 and the first reference plane P1 needs to be set to be smaller. When the travel of the wheel 100 of the all-terrain vehicle 2 is large, the angle between L1 and the first reference plane P1 needs to be set to be larger. In this way, the angle may be better coordinated with the wheels 100. In addition, the angle between L1 and the first reference plane P1 is set to be in an appropriate range, so that a stretching length of the main control arm 40 can be longer, and performance of the main control arm 40 can be better.

In addition, as shown in FIG. 1, the first inner end 42 is located in a front inner side of the third inner end 52, and the second inner end 43 is located in a front inner side of the fourth inner end 62. In this way, the first inner end 42 and the second inner end 43 are closer to the inner side, so that the stretching length of the main control arm 40 is longer, and the performance of the main control arm 40 is better.

Specifically, as shown in FIG. 1 and FIG. 3, the axle support 30 may include a main support 31, an upper mounting part 32, and a lower mounting part 33. Both the upper mounting part 32 and the lower mounting part 33 are disposed on the main support 31, and both the upper mounting part 32 and the lower mounting part 33 protrude inward. The first outer end 41 is connected to the lower mounting part 33, and the second outer end 51 and the third outer end 61 are connected to the upper mounting part 32. Both the upper mounting part 32 and the lower mounting part 33 are disposed on the main support 31. In this way, the main support 31, the upper mounting part 32, and the lower mounting part 33 may form an integrated body, to facilitate mounting of the axle support 30. The first outer end 41 is connected to the lower mounting part 33, and the second outer end 51 and the third outer end 61 are connected to the upper mounting part 32. In this way, the main control arm 40, the front upper control arm 50, and the rear upper control arm 60 are connected to the axle support 30, so that structures of the left rear suspension assembly and the right rear suspension assembly are more integrated, and a structure of the first outer end 41 is different from structures of the second outer end 51 and the third outer end 61.

As shown in FIG. 2, the all-terrain vehicle may further include a ball joint bearing B1, and the outer ends of the main control arm 40, the front upper control arm 50, and the rear upper control arm 60 are all connected to the axle support 30 through the ball joint bearing B1. The ball joint bearing B1 may play a role of mounting and connection, and may rotate and sway at any angle during movement. The outer ends of the main control arm 40, the front upper control arm 50, and the rear upper control arm 60 are all connected to the axle support 30 through the ball joint bearing B1. In this way, the main control arm 40, the front upper control arm 50, and the rear upper control arm 60 may move relative to the axle support 30, these movements do not change a positioning characteristic of the wheels 100, and the wheel 100 positioning that meets the driving requirement of the all-terrain vehicle 2 can always be maintained.

In the description of this application, it should be understood that orientations or positional relationships indicated by the terms such as "center", "longitudinal", "transverse", "length", "width", "above", "under", "front", "back", "left", "right", "vertical", "horizontal", "top", "bottom", "inside", "outside", "clockwise", "counterclockwise", "axial", "radial", and "circumferential", are orientations or positional relationships shown in the accompanying drawings, and are only intended to facilitate and simplify the description of this disclosure, but are not intended to indicate or imply that an indicated apparatus or component needs to have a specific orientation and be constructed and operated in a specific orientation. Therefore, the terms cannot be construed as a limitation on this disclosure.

In the description of this disclosure, "a first feature" and "a second feature" may include one or more of the features. In the description of this disclosure, "a plurality of" means two or more. In the description of this disclosure, that the first feature is "above" or "below" the second feature may include that the first feature and the second feature are in direct contact, or may include that the first feature and the second feature are not in direct contact but are in contact through another feature between the first feature and the second feature. In the description of this disclosure, that the first feature is "on", "above", and "over" the second feature includes that the first feature is directly above and diagonally above the second feature, or only indicates that the level of the first feature is higher than that of the second feature.

In the description of this specification, with reference to the description of the term, for example, "one embodiment", "some embodiments", "exemplary embodiment", "an example", "a specific example", or "some examples", means that a specific feature, structure, material, or characteristic described with reference to the embodiment or example are included in at least one embodiment or example of this disclosure. In this specification, a schematic description of the foregoing term does not necessarily refer to a same embodiment or example.

Although the embodiments of this disclosure have been shown and described, a person of ordinary skill in the art may understand that various changes, modifications, replacements, and variations may be made to these embodiments without departing from principles and objectives of this disclosure, and the scope of this disclosure is limited by the claims and equivalents thereof.

What is claimed is:

1. A rear suspension system of an all-terrain vehicle, comprising a left rear suspension assembly and a right rear suspension assembly, wherein the left rear suspension assembly and the right rear suspension assembly are disposed opposite to each other in a left-right direction, and each of the left rear suspension assembly and the right rear suspension assembly comprises:
an axle support;
a main control arm, wherein the main control arm comprises a first outer end, a first inner end, and a second inner end, and the first outer end is connected to the axle support through a ball joint bearing such that the first outer end is rotatably connected to the axle support;
a front upper control arm, wherein the front upper control arm comprises a second outer end and a third inner end, and the second outer end is connected to the axle support through a ball joint bearing such that the second outer end is rotatably connected to the axle support; and
a rear upper control arm, wherein the rear upper control arm comprises a third outer end and a fourth inner end, and the third outer end is connected to the axle support through a ball joint bearing such that the third outer end is rotatably connected to the axle support; and a center connection line between the first inner end and the second inner end is L1, a center axis of the first outer end is L2, a center connection line between the third inner end and the fourth inner end is L3, a center connection line between the second outer end and the third outer end is L4, and L1, L2, L3, and L4 are parallel to each other.

2. The rear suspension system of an all-terrain vehicle according to claim 1, wherein a vertical plane that passes through a midpoint of a center connection line of the two axle supports of the left rear suspension assembly and the right rear suspension assembly is a first reference plane, and the left rear suspension assembly and the right rear suspension assembly are symmetrically disposed relative to the first reference plane.

3. The rear suspension system of an all-terrain vehicle according to claim 2, wherein the first inner end is located in front of the second inner end, a distance from the first inner end to the first reference plane is a1, a distance from the second inner end to the first reference plane is a2, and a1 and a2 meet a relational expression: a1>a2.

4. The rear suspension system of an all-terrain vehicle according to claim 2, wherein a horizontal plane that passes through the center connection line of the two axle supports is a second reference plane, an angle between a projection of L1 on the second reference plane and a projection of the first reference plane on the second reference plane is a, and a meets a relational expression: $10° \leq \alpha \leq 25°$.

5. The rear suspension system of an all-terrain vehicle according to claim 1, wherein the axle support comprises a main support, an upper mounting part, and a lower mounting part, both the upper mounting part and the lower mounting part are disposed on the main support and protrude inward, the first outer end is connected to the lower mounting part, and the second outer end and the third outer end are connected to the upper mounting part.

6. The rear suspension system of an all-terrain vehicle according to claim 1, wherein the rear suspension system further comprises a stabilizer bar, and two ends of the stabilizer bar are respectively connected to the main control arm of the left rear suspension assembly and the main control arm of the right rear suspension assembly; and the left rear suspension assembly and the right rear suspension assembly each comprise a shock absorber, and a lower end of the shock absorber is disposed on the main control arm.

7. The rear suspension system of an all-terrain vehicle according to claim 6, wherein the main control arm comprises a first rod and a second rod, the first rod is located in front of the second rod, an outer end of the first rod is connected to an outer end of the second rod to form the first outer end, an inner end of the first rod is the first inner end, an inner end of the second rod is the second inner end, the ends of the stabilizer bar and the lower end of the shock absorber are disposed on the first rod or the second rod, the ends of the stabilizer bar are disposed adjacent to a midpoint of the first rod or the second rod, and the lower end of the shock absorber is disposed adjacent to the first outer end.

8. An all-terrain vehicle, comprising a rear suspension system, wherein the rear suspension system comprises a left rear suspension assembly and a right rear suspension assembly, the left rear suspension assembly and the right rear suspension assembly are disposed opposite to each other in a left-right direction, and each of the left rear suspension assembly and the right rear suspension assembly comprises:

an axle support;

a main control arm, wherein the main control arm comprises a first outer end, a first inner end, and a second inner end, and the first outer end is connected to the axle support through a ball joint bearing such that the first outer end is rotatably connected to the axle support;

a front upper control arm, wherein the front upper control arm comprises a second outer end and a third inner end, and the second outer end is connected to the axle support through a ball joint bearing such that the second outer end is rotatably connected to the axle support; and a rear upper control arm, wherein the rear upper control arm comprises a third outer end and a fourth inner end, and the third outer end is connected to the axle support through a ball joint bearing such that the third outer end is rotatably connected to the axle support; and a center connection line between the first inner end and the second inner end is L1, a center axis of the first outer end is L2, a center connection line between the third inner end and the fourth inner end is L3, a center connection line between the second outer end and the third outer end is L4, and L1, L2, L3, and L4 are parallel to each other.

9. The all-terrain vehicle according to claim 8, wherein a vertical plane that passes through a midpoint of a center connection line of the two axle supports of the left rear suspension assembly and the right rear suspension assembly is a first reference plane, and the left rear suspension assembly and the right rear suspension assembly are symmetrically disposed relative to the first reference plane; and the first inner end is located in front of the second inner end, a distance from the first inner end to the first reference plane is a1, a distance from the second inner end to the first reference plane is a2, and a1 and a2 meet a relational expression: a1>a2.

10. The all-terrain vehicle according to claim 8, wherein the rear suspension system further comprises a stabilizer bar, and two ends of the stabilizer bar are respectively connected to the main control arm of the left rear suspension assembly and the main control arm of the right rear suspension assembly;

the left rear suspension assembly and the right rear suspension assembly each comprise a shock absorber, and a lower end of the shock absorber is disposed on the main control arm; and the main control arm comprises a first rod and a second rod, the first rod is located in front of the second rod, an outer end of the first rod is connected to an outer end of the second rod to form the first outer end, an inner end of the first rod is the first inner end, an inner end of the second rod is the second inner end, the ends of the stabilizer bar and the lower end of the shock absorber are disposed on the first rod or the second rod, the ends of the stabilizer bar are disposed adjacent to a midpoint of the first rod or the second rod, and the lower end of the absorber is disposed adjacent to the first outer end.

11. An all-terrain vehicle, comprising:

a frame;

a cockpit, disposed in the middle of the frame, wherein two seats are disposed side by side in the cockpit;

wheels, supporting the frame and comprising front wheels and rear wheels;

a front suspension system, connecting the front wheels to the frame; and a rear suspension system, connecting the rear wheels to the frame, wherein the rear suspension system comprises a left rear suspension assembly and a right rear suspension assembly, the left rear suspension assembly and the right rear suspension assembly are disposed opposite to each other in a left-right direction, and the left rear suspension assembly and the right rear suspension assembly each comprise:

an axle support;

a main control arm, wherein a mounting base is disposed on the main control arm, the main control arm comprises a first outer end, a first inner end, and a second inner end, and the first outer end is rotatably connected to the axle support;

a front upper control arm, wherein the front upper control arm comprises a second outer end and a third inner end, and the second outer end is rotatably connected to the axle support; and a rear upper control arm, wherein the front upper control arm and the rear upper control arm each are of a rod structure, the rear upper control arm comprises a third outer end and a fourth inner end, and the third outer end is rotatably connected to the axle support; and a center connection line between the first inner end and the second inner end is L1, a center axis of the first outer end is L2, a center connection line between the third inner end and the fourth inner end is L3, a center connection line between the second outer end and the third outer end is L4, and L1, L2, L3, and L4 are parallel to each other.

12. The all-terrain vehicle according to claim 11, wherein the main control arm comprises a first rod and a second rod, the first rod is located in front of the second rod, an outer end of the first rod is fixedly connected to an outer end of the second rod to form the first outer end, an inner end of the first rod is the first inner end, an inner end of the second rod is the second inner end.

13. The all-terrain vehicle according to claim 12, further comprising a stabilizer bar and shock absorbers, wherein two ends of the stabilizer bar are respectively connected to the main control arm of the left rear suspension assembly and the main control arm of the right rear suspension assembly, and lower ends of the shock absorbers are disposed on the main control arms.

14. The all-terrain vehicle according to claim 13, wherein the ends of the stabilizer bar and the lower ends of the shock absorbers are disposed on the first rod or the second rod, the ends of the stabilizer bar are disposed adjacent to a midpoint of the first rod or the second rod, and the lower ends of the shock absorbers are disposed adjacent to the first outer ends.

15. The all-terrain vehicle according to claim 11, wherein a vertical plane that passes through a midpoint of a center connection line of the two axle supports of the left rear suspension assembly and the right rear suspension assembly is a first reference plane, and the left rear suspension assembly and the right rear suspension assembly are symmetrically disposed relative to the first reference plane.

16. The all-terrain vehicle according to claim 15, wherein the first inner end is located in front of the second inner end, a distance from the first inner end to the first reference plane is a1, a distance from the second inner end to the first reference plane is a2, and a1 and a2 meet a relational expression: a1>a2.

17. The all-terrain vehicle according to claim 14, wherein a horizontal plane that passes through the center connection line of the two axle supports is a second reference plane, an angle between a projection of L1 on the second reference plane and a projection of the first reference plane on the second reference plane is a, and a meets a relational expression: $10° \leq \alpha \leq 25°$.

18. The all-terrain vehicle according to claim 11, wherein the axle support comprises a main support, an upper mounting part, and a lower mounting part, both the upper mounting part and the lower mounting part are disposed on the main support and protrude inward, the first outer end is connected to the lower mounting part, and the second outer end and the third outer end are connected to the upper mounting part.

* * * * *